Figure 2:
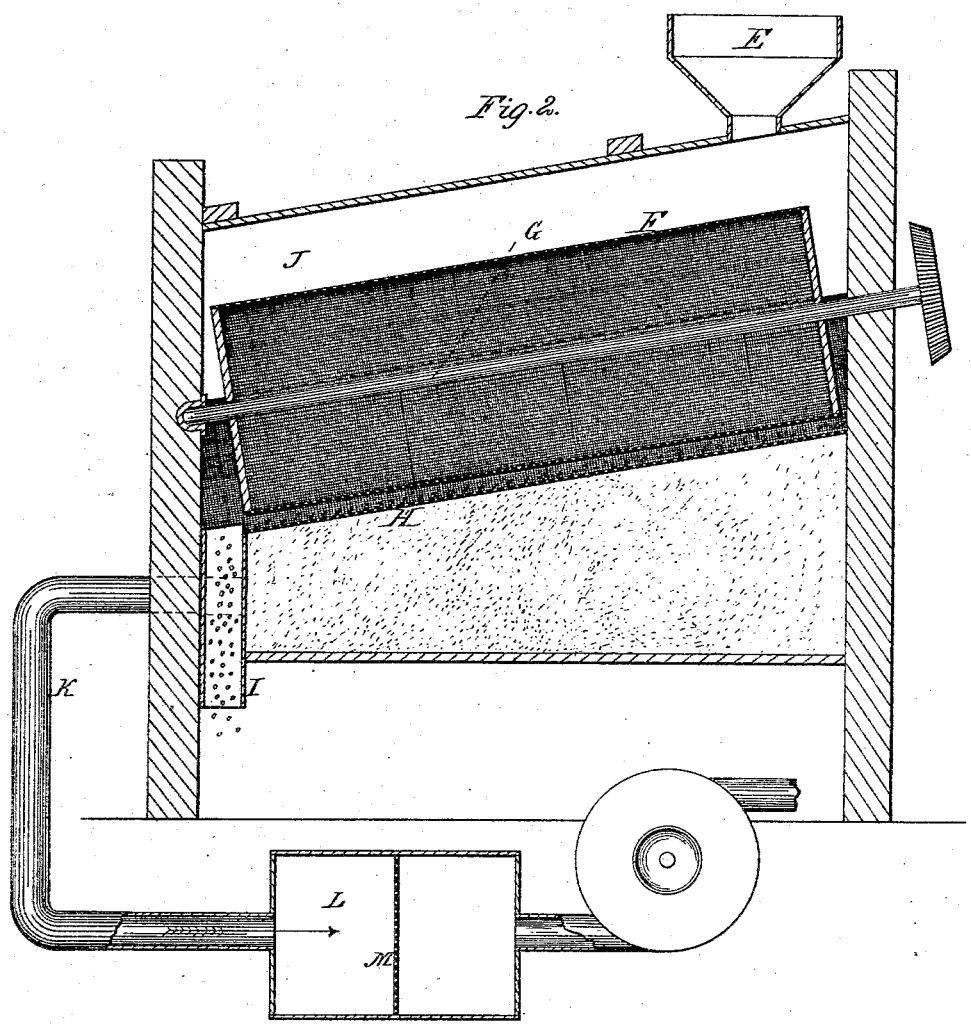

(No Model.) 2 Sheets—Sheet 1.
T. TAYLOR.
PROCESS OF TREATING COTTON SEED.
No. 289,041. Patented Nov. 27, 1883.
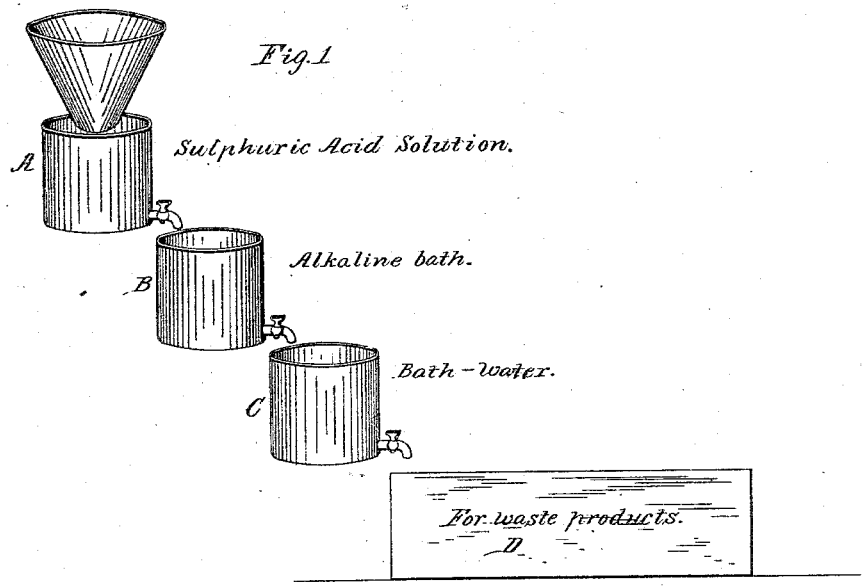
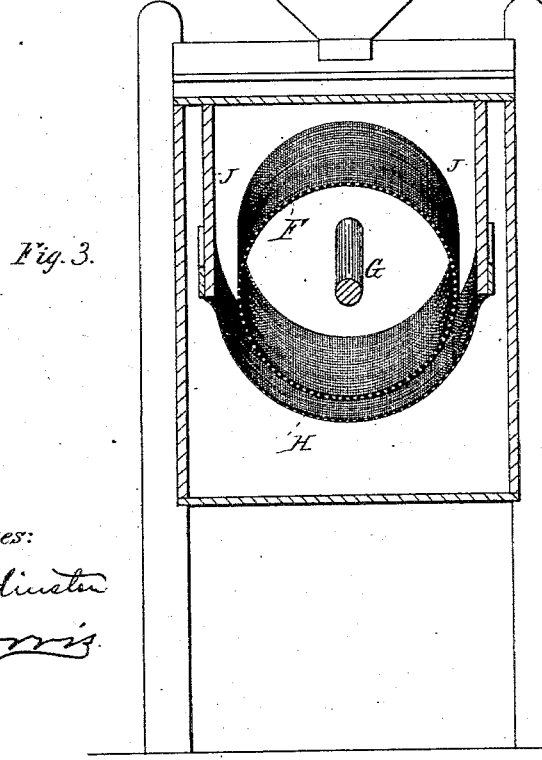
Witnesses:
W. C. Jirdinster
D. W. Norris
Inventor:
Thomas Taylor
by Melville Church
his Attorney.

(No Model.)

2 Sheets—Sheet 2.

T. TAYLOR.
PROCESS OF TREATING COTTON SEED.

No. 289,041. Patented Nov. 27, 1883.

Witnesses:

Inventor:
Thomas Taylor
by
Melville Church
his Attorney.

UNITED STATES PATENT OFFICE.

THOMAS TAYLOR, OF WASHINGTON, DISTRICT OF COLUMBIA.

PROCESS OF TREATING COTTON-SEED.

SPECIFICATION forming part of Letters Patent No. 289,041, dated November 27, 1883.

Application filed June 2, 1883. (No model.)

*To all whom it may concern:*

Be it known that I, THOMAS TAYLOR, of the city of Washington, in the District of Columbia, have invented a certain new and Improved Process of Treating Cotton-Seed; and I do hereby declare the following to be a full, clear, and exact description of the same, reference being had to the accompanying drawings, forming a part of this specification, and to the figures and letters of reference marked thereon.

Heretofore various attempts have been made to remove the fiber from cotton-seed by the employment of mechanical stripping contrivances; but the percentage of fiber so secured has been so small as to render the plan a failure from an economic point of view. Attempts have also been made to remove the fiber by the use of acids or other chemicals; but while the seeds have been successfully cleared of the fiber by such process, the fiber has been so injured by the action of the acids or other chemicals as to be rendered practically valueless. I have recently invented and patented (April 24, 1883) an improved process of treating cotton-seed, by which, by the employment of heat and crushing and separating devices, I am enabled to crush the seed, separate its kernel from its hull, and then the adherent fiber from the hull particles, and thus secure and save not only the kernel freed from hull particles, but also the fiber. As my said patented process, however, contemplates the crushing of the seed and the removal of the adherent fiber at one and the same operation, it is most effectively and economically carried out at points not far distant from the place of cotton-seed supply, in view, especially, of the fact that seed transported a long distance— from this country to England, for instance— keeps and is delivered in better condition if divested of its adherent fiber before shipment than if shipped with the fiber left still adherent.

The object of my present invention, therefore, is to effect in a novel and economical manner the removal of the fiber from the seed without destroying the fiber, and without injury to the hull of the seed or to the kernel within the hull, so that the seed may be divested of its fiber before shipment, and then shipped in a condition best adapted to its preservation.

To this end my present invention consists, primarily, in subjecting the seed in the condition in which it comes from the gins to the action for a suitable period of a solution of sulphuric acid and water, in the proportions of one part of sulphuric acid of commerce, by measure, to from two to six parts of water, by measure, and then separating the loosened fiber from the hull of the seed by a mechanical rubbing action.

It further consists in certain novel details of the process, which I will hereinafter fully describe, and then point out particularly in the claims.

I have found upon experiment that if the cotton-seed in the condition in which it is when it comes from the gins is immersed in sulphuric acid of commerce the fiber on the seed will be dissolved and quickly converted into charcoal. I have also found that a solution of one part of the sulphuric acid of commerce at 60° Baumé and one part of water, by measure, used at the ordinary temperature of the atmosphere, will destroy the fiber and sometimes form it into a gelatinous mass and render it entirely useless. On the other hand, I have found that if the solution contains too much water, the hull of the seed will become softened, and the acid and water together will be absorbed by the kernel and the latter rendered worthless. For instance, if cotton-seed is immersed in a solution of one measure of acid to ten of water for a period of three days it will become quite soft, so that it may be crushed between the fingers, while the cotton fiber is in no way loosened from the roots; but if the seed be immersed in a solution of sulphuric acid one part, by measure, and water from two to six parts, by measure, the fiber will be loosened from its root-cells, the cuticle of the seed partially disintegrated, the hull proper rendered impervious to water or acid, and the kernel kept perfectly dry, and this though the seed remains immersed in the solution for several days. The action of the acid solution, when of the proportions last above given, is to decompose the substance of the cells in which the fiber grows, and to abstract water from the albumen of the hull proper, so as to consolidate its surface and render it impervious to the solution. As it is desirable to hasten the process of loosening the fiber, I preferably employ a solution in which one part of sulphuric acid, by measure, is combined with from two to four parts of water.

In carrying out my invention I first preferably immerse the seed in an acid solution of a strength within the limits hereinabove given, and at or about the temperature of the atmosphere, care being taken that the seeds are completely immersed, as otherwise the fiber will become injured. In from two to three days the fiber will be loosened, and can be rubbed from the seed by the fingers; but as a next step I preferably wash the seed with a weak alkaline solution, to neutralize the acid which might otherwise corrode the fiber. After this, I wash the seed with water, to free the fiber from the salt formed by the combination of the acid with the alkali, and then place the seed on a floor or in a drying-room, to dry under a moderate temperature. When dry, the seed is then subjected to the action of any suitable mechanical contrivance which will rub off the loosened fiber without injuring at all the hull proper. The removed fiber may be used in the manufacture of paper or for other purposes, while the cleaned seeds may be either ground into meal or compressed for oil and oil-cake purposes, as desired. In the process of treatment, the seeds, after leaving the acid solution, may be washed with water, to save the acid, then with the alkaline solution, then with water again, and then dried, and finally divested of their fiber.

The accompanying drawings illustrate one form of apparatus which may be employed in carrying out the treatment, Figure 1 representing the means employed up to the drying step, and Figs. 2 and 3 a longitudinal sectional view and a cross-section, respectively, of a machine for effecting the removal of the loosened fiber from the seeds.

Similar letters in the several figures indicate the same parts.

A represents a lead-lined vat for containing the acid solution; B, a similar vat for containing the alkaline bath; C, a similar vat for containing the water bath, and D a receptacle for waste products. The passage of the seeds through the preliminary stages of treatment involving the use of the above instrumentalities has been hereinbefore described.

In the fiber-removing machine represented in Figs. 2 and 3, E represents a hopper, into which the seed is fed after treatment with the acid solution; F, a wire-gauze cylinder supported upon and connected rigidly to a continuously-revolving inclined shaft G; H, a half-cylinder or concave of wire-gauze, so arranged with relation to the cylinder F as to leave a semi-annular space between the two for the passage of the seed; I, a discharge-spout, by means of which the cleaned seeds are conducted from the machine. The cylinder F and concave H are arranged within a casing, J, as shown.

When in operation the previously-treated seeds are fed into the hopper E, from which they pass onto the cylinder F, and thence between the said cylinder and the concave H, where they are rubbed and abraded between the gauze surfaces until all the fiber is removed, the cleansed seeds tailing off through the discharge-spout I, while the fiber passes through the meshes of the concave into the chamber of the case, and is drawn thence out through an exhaust-pipe, K, and into a chamber, L, where it is assorted by a wire-gauze partition, M, across said chamber, and formed or felted into a sheet. Any well-known means may be employed for inducing the suction through the machine; or, in lieu of a suction, a blast may be employed.

While the particular apparatus which I have herein shown and described is competent to carry out my improved process of treating cotton-seed, I do not desire to be understood as confining myself to the use of such apparatus alone, as it is susceptible of many modifications, and any equivalent of it will answer as well.

The cotton fiber removed from the seeds and saved by my improved process can be ulitized to advantage in the manufacture of paper and for other purposes, while the cleaned seeds are less liable to deterioration from heat and dampness than seeds on which the fiber still remains.

The specific gravity of the sulphuric acid used by me in carrying out the improved process herein disclosed, and referred to as "sulphuric acid of commerce," should be from 60° to 64° Baumé.

I claim as my invention—

The hereinbefore-described process of treating cotton-seed so as to preserve the adherent fibrous matter, which consists in treating the seed with a solution composed of one part of sulphuric acid of commerce and from two to six parts of water, by measure, as set forth.

THOMAS TAYLOR.

Witnesses:
WM. A. JOHNSON,
FRED F. CHURCH.